Dec. 18, 1945.	E. A. KELLY	2,391,054
MULTIPLE PAYMENT COUPON BOOK
Filed March 18, 1944	2 Sheets-Sheet 1
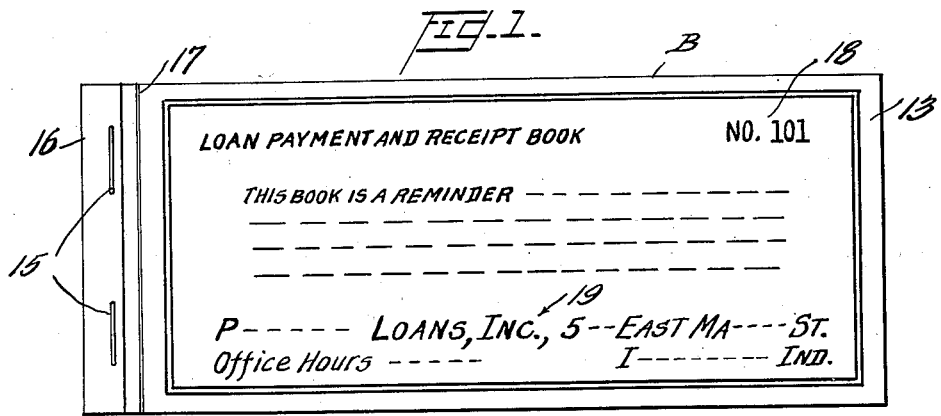
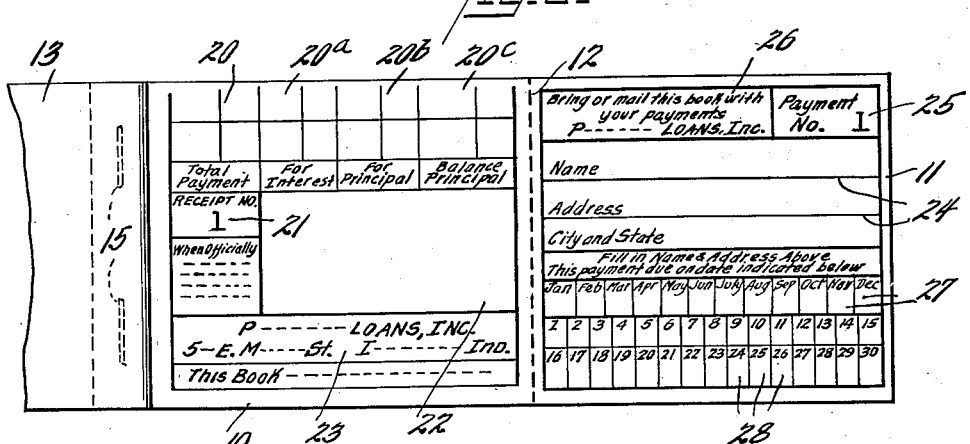
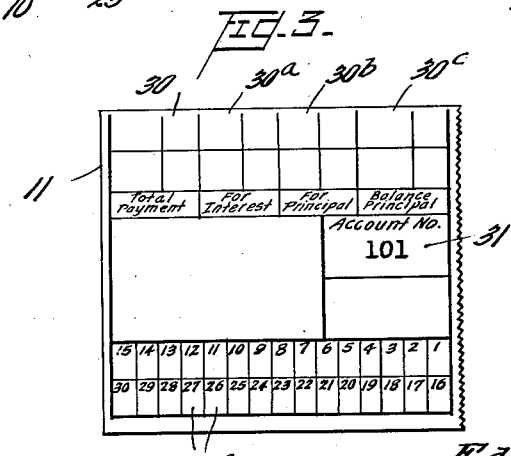
Inventor
Edward A. Kelly,
By
Attorney Dec. 18, 1945.  E. A. KELLY  2,391,054

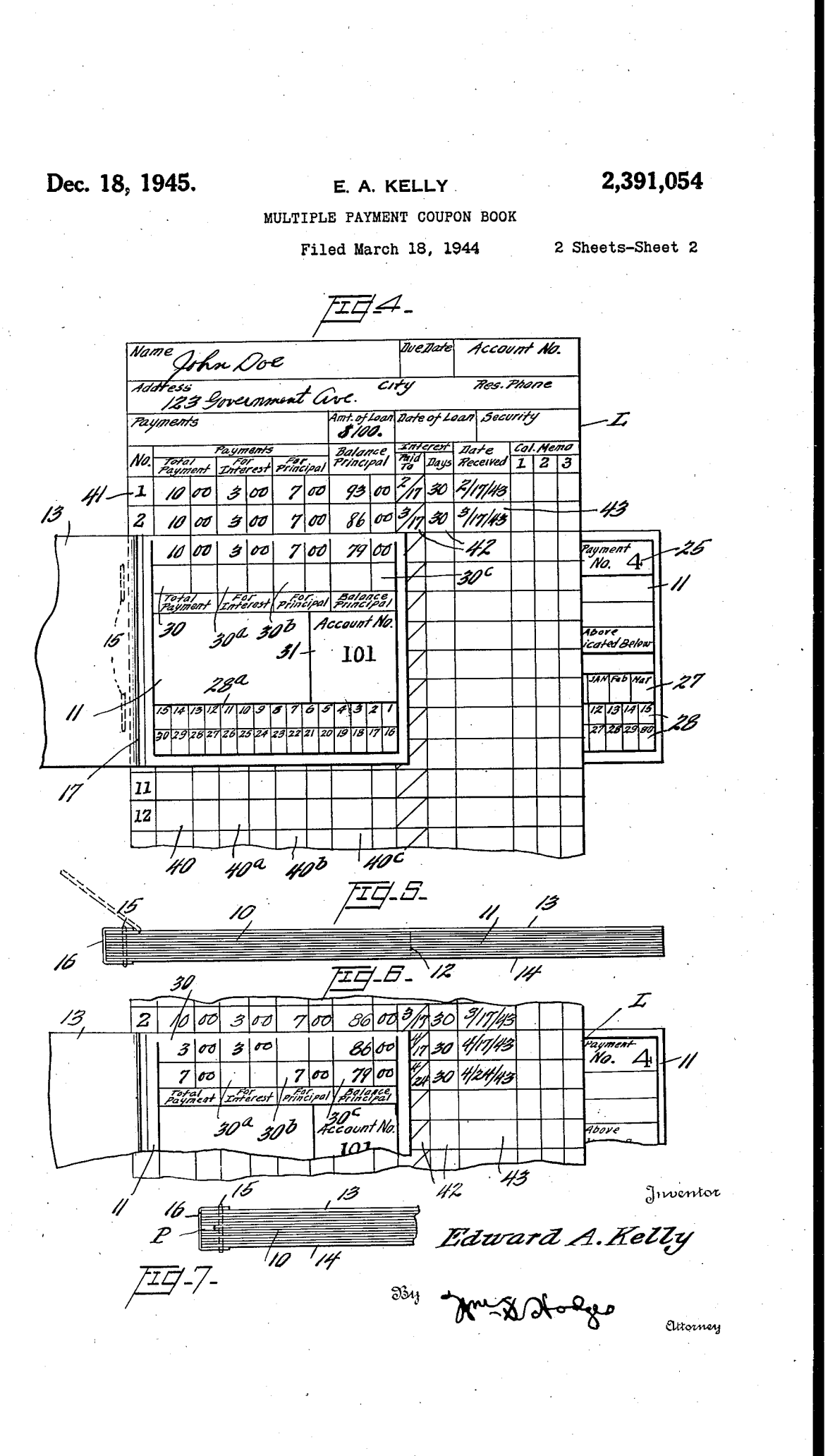

MULTIPLE PAYMENT COUPON BOOK

Filed March 18, 1944  2 Sheets-Sheet 2

Inventor
Edward A. Kelly
By Jno. H. Hodges
Attorney

Patented Dec. 18, 1945

2,391,054

UNITED STATES PATENT OFFICE 2,391,054

MULTIPLE PAYMENT COUPON BOOK

Edward A. Kelly, Indianapolis, Ind.

Application March 18, 1944, Serial No. 527,104

5 Claims. (Cl. 282—9)

This invention is a payment coupon book primarily designed for use in crediting current payments on chattel and other similar loans.

The Small Loan Acts now in force in many of the States of the United States require the maintenance of records wherein the interest on unpaid principal balances is credited at the time that each payment is made. Also the delivery to the borrower of a receipt showing what portion of each payment is respectively applied to interest and the principal, and the "principal balance" remaining due after the payment has been duly credited. When such entries are posted to a ledger record, it is necessary to supplement them with entries of other information, including the date that the payment is received, the date to which interest is paid, the number of days of the interest period, (usually based on a thirty day month), and the teller's initial or his identification number. In practice, loan companies having accounts of this character, require considerable time to prepare the proper receipts, and to post and to make up the necessary forms to properly record the respective payments as they are received. In fact, these details must be completed in the presence of the person making the payment, so that he may be given the required receipt containing the above mentioned essential data required by law, before he leaves the Company office. In practice, errors frequently occur when figures are copied to three separate forms, and as to two of these postings, the one made to the ledger card and the one made to the borrower's pass book or receipt, are made under pressure, while the borrower is waiting for his receipt.

One of the objects of the present invention is to reduce the labor and time expenditure required to make the above mentioned entries, in order to comply with the law, by providing a group of coupon sheets in book form corresponding in number to the payments to be made, and arranged and bound in a manner which will allow the teller to insert and register the borrower's ledger record card firmly in the coupon book, in a predetermined position of entry, and then by the use of carbon paper, complete all three records at one writing. Thus, saving time for both the borrower and the teller for the loan company, and eliminating the possibility of error in the entries on the several forms involved.

Another object of the invention is to furnish the borrower with a protective form of receipt, which on its face will show all receipt information in the manner prescribed by law, and on the back of the sheet the figures relating to the application of the payment made in reverse order and in absolute registration therewith.

A further object is to provide a coupon book of the character above mentioned containing spaces for payment record indicia correlated to complemental columns for said date, on a ledger record sheet, so that said spaces and said columns may be selectively brought into register for the purpose of making duplicate entries therein at the time that they are made, and means for preventing movement of the ledger record sheet with respect to said coupons while said entries are being made.

Another object of the invention is to provide a perfectly positioned means of verifying the accuracy of the figures shown on the receipt previously issued before the current entry is made, to insure that no alterations have been made therein and that no differences exist between the figures shown on said previous receipt and the ledger record card.

The invention will be hereinafter fully set forth and particularly pointed out in the claims.

In the accompanying drawings:

Figure 1 is a top plan view illustrating a coupon book conforming to the invention, the top cover sheet being in its normally closed position. Figure 2 is a similar view illustrating the top coupon sheet of the book exposed by folding back the top cover page. Figure 3 is a similar view illustrating the reverse side of the top coupon. Figure 4 is a view similar to Figure 2, with a form of ledger record sheet inserted beneath the topmost stub, showing the coupon folded thereover, and all of them in position for simultaneous entries to be made upon the stub, the coupon, and the sheet, while so positioned. Figure 5 is a longitudinal sectional view of Figure 1. Figure 6 is a detail view illustrating a modified use of the invention. Figure 7 is a detail sectional view illustrating a modification of the ledger-sheet clamping means.

Referring to the drawings, B designates a coupon book which is made up of a plurality of record sheets, each in the form of a stub 10 and a detachable coupon 11, suitable means such as perforations 12, or the like, being provided by which the coupon may be readily separated from its stub. Any number of the coupon sheets consisting of stubs 10 and coupons 11 may be arranged in superimposed relationship, and bound together in suitable manner between top and bottom cover pages 13 and 14, respectively, of coextensive area with said sheets. The cover pages and the coupon sheets are bound together in any suitable manner, such as by stitching or wire staples 15, for instance, arranged in a straight line extending transversely across the assembled superimposed sheets. Therefore, wherever the term "stitches" or "stitching" is used in this specification or in the claims, it is to be understood that the above mentioned methods of binding the sheets together are to be considered as full equivalents of each other. As a matter of convenience, the secured ends of the coupon sheets and cover sheets are covered by an additional binding strip 16, of suitable material, such as cloth. It will be noted that the top cover sheet 13 is provided with a scored or weakened line 17 extending transversely thereof and arranged parallel with the stitches 15, or other securing means, so as to provide a gripping or clamping member or portion for a purpose to be later described. The top cover page 13 may be provided with any suitable data (not shown), identifying the name of the holder of the coupon in a well known manner. It also preferably contains the account number indicated at 18, and suitable indicia indicated at 19 portraying the name of the issuing company, as well as such instructions for the use of the book as may be considered desirable.

Each stub 10 is provided at its upper edge with four sets of vertical columns 20, 20a, 20b and 20c, suitably ruled for cash entries. The column 20 being provided with a legend indicating the total amount of the payment being recorded, the column 20a having a legend indicating that the amount entered therein is to be applied to the payment of interest. The column 20b contains a legend indicating that it is to be used for the entry of the amount of the payment credited to the principal, and the column 20c contains a legend to indicate the balance principal that remains due after applying these payments, is to be entered in said column. Each coupon stub bears a serial number indicated at 21, the coupons being consecutively numbered from the top to the bottom in a well known manner. There is a central space 22 provided for the impression of a receipt stamp, and the name of the issuing company is also contained in a space 23. All data, except those relating to the columns 20, 20a, 20b and 20c may be varied without departing from the spirit of the invention.

Each stub 11 bears on its front face lines indicated at 24 for the name and address of the borrower, and the serial number is indicated at 25, and corresponds to the serial number on the stub. A space 26 is also provided containing instructions to the borrower to the effect that the book must be presented with any payment. At the bottom of the top face of the coupon are a plurality of spaces 27 in which are set forth in sequence the names of the months of the calendar year, and below are spaces 28 corresponding to the day dates of a thirty day month.

On the underface of the coupon 11 is placed a series of columns, located at the top edge thereof and numbered 30, 30a, 30b and 30c. These columns are exact duplicates of the columns 20, 20a, 20b and 20c respectively on the top face of the stub and are so related with the latter space that when the coupon is folded over on top of the stub as shown in Figure 3, the corresponding spaces of the two sheets will be in register. The underface of the coupon also contains a space 31 for the account number, and also a duplicate arrangement of the day date indicia 29a, which appears on the front of the coupon, but in reversed relationship. The arrangement of date indicia is such that a punch hole through any selected day space will perforate the same day space indicated on the front of the coupon, whereby the same date will be indicated whether the coupon is viewed from the front or the back.

L designates a ledger record sheet which contains spaces for suitable data such as name and address of the borrower, the account number, and the number of payments to be made, the amount of the loan, the date of loan, and any other data that may be desired, all of which may be arranged in any desired manner. The sheet L, however, contains a plurality of columns 40, 40a, 40b and 40c, which respectively correspond to and are designed to register with the spaces 20, 20a, 20b and 20c of the stub 10, and the complemental spaces 30, 30a, 30b and 30c respectively of the coupon 11, while said coupon is folded over its stub, as shown in Figure 5. In practice, the ledger record sheet L is placed beneath the folded over coupon and its stub, with the left vertical edge abutted against the stitches 15, which serve as a gauge to correctly position the sheet L with respect to the folded-over coupon and its stub. The weakened portion 17 is spaced a sufficient distance from the stitches 15 to overlap the adjacent edge of the sheet L and to grip the latter against the underlying record sheet with sufficient force to prevent said record sheet from accidentally slipping while its columns 40, 40a, 40b and 40c are in register with the columns 20, 20a, 20b and 20c and 30, 30a, 30b and 30c of the stub and coupon respectively. The sheet L contains a column of numbers 41 to designate the numbers of each payment for which entry is to be made, and which corresponds to the stub and coupon serial numbers.

When the parts are assembled in the position shown in Figure 4, it will be readily seen that by use of carbon paper or the like, the duplicate entries may be simultaneously made on the back of a coupon 11, on the front of its complemental stub 10, and in the corresponding complemental spaces on the ledger sheet L. In addition to the columns above described, the ledger sheet also contains a column of spaces 42 for entry of the date to which interest has been paid and the number of days involved in the payment, and another column 43 to indicate the date of receipt of the payment. Other data may be provided as desired.

At the time a loan is negotiated a book B is prepared by the teller of the loan company for the borrower, by simply filling a "Statement of loan" form (not shown) which is usually printed on one of the cover pages, and then punching the coupons through the proper date boxes 27 and 28 of all of the superposed coupons, so as to show the date that each payment will come due. In this connection, it will be noted that the month abbreviations in the box 27 of the coupons 11 are staggered with relation to each other, by being shifted on each coupon one month to the left, as viewed in Figure 2. Thus, the month of February on coupon number 2 is beneath the month January on coupon number 1, and so on through the superposed coupons, so that a punch hole through any selected box 27 will perforate the successive months from the date of the loan, and thereby indicate the due date of each month on which payment must be made.

For the purposes of illustration, let it be assumed that the company has made a loan of $100 and that monthly payments are to be made in the amount of $10.00 each. Also that the contract requires that $3.00 of this payment is to be applied to the interest on the loan and that the balance $7.00 is to be applied to the principal. The book issued to the borrower will contain the contract form and the coupons will indicate the date of payment, as above stated. In the example shown in Figure 4, it is assumed that two payments have already been made and that the book is now presented for the third payment. In this event, two coupons 11 have already been removed from the book, and the stubs of serial numbers 1 and 2 constitute the borrower's receipts for these payments.

The first step is to turn back the cover sheet along the weakened line 17, and then to fold No. 3 over its stub. The ledger sheet L is placed between the gripping portions of the cover, its columns 40, 40a, 40b and 40c in register with the complemental columns 20, 20a, 20b and 20c of No. 3 stub and 30, 30a, 30b and 30c of coupon No. 3. However, care must be taken that the upper spaces of said columns of the coupon and stub will register with the portions of the ledger sheet columns opposite No. 3 on the card L. To do this the top edges of the coupon and its stub will be brought into register with line No. 2 on the ledger card, the vertical spacing of the horizontal lines of the columns 20, 20a, 20b and 20c of the stub and the columns 30, 30a, 30b and 30c of the coupon being spaced identically the same distance vertically as the numbered horizontal lines on the sheet L.

While coupon No. 3 and its stub are positioned in register with line 3 of sheet L, it is obvious that the correctness of the last previous entries i. e. at line 2 of said sheet, may be readily checked by turning back stub No. 2, so as to cause the columns 20, 20a, 20b and 20c of said stub to overlie the columns 30, 30a, 30b and 30c of coupon No. 3. In this manner the entries on said stub No. 2 will be positioned directly under and in register with the entries on said line 2 of sheet L. By this means the two sets of entries may be readily compared and any discrepancy quickly detected. In practice, it is expected that the teller will first make this check before entering the payment being tendered.

Assuming that the previous entries have been properly checked, as above described, the stub No. 2 is restored to its original position, so as to expose coupon No. 3, whereupon the teller proceeds to record the proper entries covering the tendered payment.

With proper arrangement of carbon paper, between stub and coupon No. 3, and between stub No. 3 and sheet L, the teller marks with a pencil or suitable stylus the amount of the payment, the amount credited for interest, the amount credited for principal, and the balance principal. These figures will, therefore, be simultaneously entered in the spaces on the back of coupon number 3, on the face of stub number 3, and on the line number 3 of the card in the corresponding spaces. In the example given these figures will be $10.00, $3.00, $7.00 and $79.00, respectively. During these entries it will be noted that the card is firmly gripped between the gripper portions of the coupon book, between the sitching 15 and the weakened line 17, so that there is no danger of relative slipping. Thus, it is insured that the figures will be accurately entered on the proper lines in the correct columns. At the time of making these entries, it is convenient for the teller to also fill in the data in columns 42 and 43 of card L, as to the date to which payment has been made, the number of days involved, and the date of payment. He then tears off the number 3 coupon and stamps the date in the receipt space 22 of the stub. Thereupon, the transaction is completed, the borrower having his full receipt with all the data thereon required by law, and the teller has his accurate ledger card entry. The detached stub 10 containing the same entry is available for delivery to a central office if the entry is being made at a branch office.

In the event that the required installment is not made in full at any time the credit entries will be somewhat different. See Figure 6. Let it be assumed that the amount paid on the third due date is just enough to take care of the interest. At which time, in the example given, the "Balance principal" will be $86.00. The transaction is recorded as shown in Figure 6. In such case, the amount of the payment is entered in the column total payment, the amount of $3.00 is credited for interest in the proper column, which being insufficient to decrease the amount due will leave a balance principal unchanged, i. e. $86.00. Assuming that later the default is corrected by payment of $7.00, that amount is entered in the second line of the "Total payment" column 20 of the same coupon as that which received the previous entry. This amount is credited in the "For principal" column 20b for the amount to be devoted to principal, so that the balance principal then becomes $79.00, which is entered in the "Balance principal" column 20c. All of these entries are simultaneously made upon the ledger card L and the stub 10 in exactly the same manner as above described.

If desired, the gripping functions of the cover pages, at the bound ends thereof, may be increased by placing a narrow strip P, of paper or the like, between the stitches 15 and the adjacent extremities of the coupon sheets. See Figure 7.

The advantages of the invention will be readily understood by those skilled in the art to which it belongs. For instance, an important advantage is that a very short time is required to enter the payment data on the stub, on the coupon, and on the ledger card respectively, and that because the three sets of entries are made simultaneously by duplication through the use of carbon paper or other similar reproduction material; they must agree, thereby greatly reducing the error factor incident to the making of such entries. Thus, the ledger card has all of the necessary information with respect to balance and interest dates, so that in each instance the teller may readily figure the amount of the current payment applicable to interest. At the same time the borrower receives his receipt in the form of the retained stub, which contains all of the data required by law to be furnished him, and which enables him, by glancing at the last receipted stub, to determine the exact amount that is due on his indebtedness. The retained stubs will also show just exactly how many payments he has made and how they have been credited. Another advantage is that each time a payment is received and an entry is made, the book and the ledger card are so positioned as to allow a positive check with the replica figures on the previous stub, thus preventing alterations and insuring the customer's record and the company's ledger card being in balance at all times. A further and important advantage is that by arranging the coupon book with a clamping portion, the binding stitches will accurately gage the position of the ledger sheet, and the latter sheet will be firmly held in juxtaposition with respect to the coupons and stubs which are arranged to register therewith, thereby reducing the possibility of error due to relative slipping of the card with respect to the book. For instance, it will be observed that the gripping portion of the top cover sheet is sufficiently wide to grip a substantial portion of the edge of the ledger sheet and with sufficient frictional area to very firmly grip said sheet.

Having thus explained the nature of the invention and described an operative manner of constructing and using the same, although without attempting to set forth all of the forms in which it may be made, or all of the forms of its use, what is claimed is:

1. A coupon book assembly having in combination a plurality of duplicate coupon sheets arranged in superimposed relationship, each sheet consisting of a stub and a detachable coupon, the top face of said stub and the bottom face of said coupon having duplicated spaces appropriately designated for payment data entries which are so relatively positioned that they will be in register when the coupon is folded over the top face of its stub, a cover having top and bottom sheets enclosing said coupons, means for binding the coupons and the cover sheets in superimposed assembled relationship, said binding means extending in a straight line transversely of the sheets at one end of the book, the top page of said cover having a weakened portion arranged to said binding means and parallel thereto, so that said top cover page may be folded back along said line to expose the coupon sheets, the portion of the top cover page between said securing means and said weakened portion providing one member of a clamp portion located at a predetermined position with respect to said stubs, and a ledger record sheet having columns of appropriately designated payment data spaces which are duplicates of the payment data spaces of any stub and its folded over coupon and are selectively registrable therewith, whereby said ledger sheet may be removably held by said clamping means with one edge in engagement with said binding means, so as to position data spaces of said ledger sheet in register with correlated data spaces in the topmost stub and its coupon, and the above mentioned entries may be simultaneously transferred to the ledger sheet as they are recorded on the back of each stub, whereby after each coupon is detached from its stub, the latter will serve as the borrower's payment receipt, and the detached coupon and the ledger sheet will each contain a replica of the entry on said payment receipt.

2. A multiple payment coupon book assembly having in combination a plurality of coupon sheets, each sheet consisting of a stub and a complemental detachable record coupon, the latter being foldable laterally so as to cover its stub, the face of each stub and the back of each coupon having a plurality of complemental longitudinally aligned duplicated spaces appropriately designated for the entry of predetermined payment data, said spaces being so positioned that those of the coupon will register with those of the stub while the coupon is in its folded position over said stub, whereby entries made in the spaces of the folded-over coupon may be simultaneously duplicated in the corresponding spaces of the stub lying beneath the same, cover pages enclosing said coupon sheets, means for binding said cover pages and said coupon sheets into book form, one of said cover pages being foldable along a line parallel with said binding means but spaced therefrom, said line of fold being in a predetermined position with respect to the position of the payment data spaces of said stub, so as to provide a clamp portion adapted to hold a ledger record sheet in juxtaposition with the folded coupon and its stub, whereby payment data spaces on said ledger sheet may be held in register with the payment data spaces of the stub and folded-over coupon, so that after each coupon is detached from its stub the latter will serve as the borrower's payment receipt and the detached coupon and the ledger sheet will each contain a replica of the entries on the stub, and a strip of material interposed between said coupon sheets at the bound extremities thereof so as to increase the gripping tension of said clamp portion.

3. A coupon book assembly having in combination a plurality of duplicate coupon sheets arranged in superimposed relationship, each sheet consisting of a stub and a complemental detachable coupon, both of coextensive area, each coupon being foldable laterally to cover the top face of its stub, the front face of each stub and the back face of its coupon each having a plurality of duplicate spaces appropriately designated for the entry of predetermined payment data, said spaces being so positioned that they will be in register when the coupon is in its folded-over position, whereby payment data entries made in the spaces of the folded-over coupon may be simultaneously duplicated in the corresponding registering spaces of the stub, a removable ledger record sheet having columns of payment data spaces appropriately designated and corresponding to the payment data spaces of the stubs and coupons and adapted to register therewith, binding means extending in a straight line transversely of the sheets at one end of the book for binding said sheets together, said books having means anchored by said binding means and located at a predetermined position with respect to the payment data spaces on the stub, for removably gripping one edge of said ledger record sheet while an edge of the latter is abutted against said binding means, and with data on said ledger sheet in juxtaposition with correlated registering data spaces on the stub and its coupon so that the above mentioned entries may be simultaneously transferred to the record sheet while the latter is so held, whereby after the ledger sheet is removed from engagement with said clamping means and each coupon is detached from its stub, the latter will serve as the borrower's payment receipt and the detached coupon and the ledger sheet will each contain a replica of the entries on said coupon.

4. A multiple payment coupon book assembly having in combination a plurality of coupon sheets, each sheet consisting of a stub and a complemental detachable record coupon, the latter being foldable over its stub in a manner to cover the latter, the face of each stub and the back of its coupon having a plurality of longitudinally aligned complemental spaces appropriately designated for the entry of predetermined payment data, said spaces being so positioned that those of each coupon will register with those of its stub while the folded coupon overlies the latter, whereby entries made in the exposed spaces of the folded-over coupon may be simultaneously duplicated in the corresponding registering spaces on the face of its stub, gripping means associated with said superimposed coupon sheets, and binding means for securing the gripping means to the outer ends of the superimposed stubs, said clamping means having a portion extended a predetermined distance from said binding means toward the coupons, so as to provide a portion for releasably gripping an edge portion of an inserted ledger record sheet having said edge portion abutted against said binding means, whereby said binding means serves as a gage to so position the gripped ledger record sheet that payment-data spaces on the latter will be in register with the registering payment-data spaces of each folded-over coupon and its stub.

5. A multiple payment coupon book assembly having in combination a plurality of coupon sheets, each sheet consisting of a stub and a complemental detachable record coupon, the latter being foldable over its stub in a manner to cover the latter, the face of each stub and the back of its coupon having a plurality of longitudinally aligned complemental spaces appropriately designated for the entry of predetermined payment data, said spaces being so positioned that those of each coupon will register with those of its stub while the folded coupon overlies the latter, whereby entries made in the exposed spaces of the folded-over coupon may be simultaneously duplicated in the corresponding registering spaces on the face of its stub, gripping means associated with said superimposed coupon sheets, and binding stitching for securing said gripping means to the outer end portions of said superimposed stubs, said stitching extending in a straight line transversely of the stubs, said gripping means having a portion extended a predetermined distance from said stitching toward the coupons, so as to provide a portion for releasably gripping an edge portion of an inserted ledger record sheet having said edge portion abutted against said stitching, whereby the stitching serves as a gage to so position said ledger sheet that payment-data spaces on the latter will be held in register with the registering payment-data spaces of each folded-over coupon and its stub.

EDWARD A. KELLY.